United States Patent
Gawande et al.

(10) Patent No.: US 11,363,077 B2
(45) Date of Patent: Jun. 14, 2022

(54) COMMUNICATION SESSION PARTICIPATION USING PRERECORDED MESSAGES

(71) Applicant: Avaya Management L.P., Durham, NC (US)

(72) Inventors: Harshal Ramesh Gawande, Maharashtra (IN); Ajay Jagdish Talreja, Maharashtra (IN); Ghanshyam Asaram Baheti, Maharashtra (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/074,166

(22) Filed: Oct. 19, 2020

(65) Prior Publication Data

US 2022/0124127 A1   Apr. 21, 2022

(51) Int. Cl.
*H04L 65/1089* (2022.01)
*H04L 51/04* (2022.01)
*H04L 51/08* (2022.01)

(52) U.S. Cl.
CPC ......... *H04L 65/1089* (2013.01); *H04L 51/04* (2013.01); *H04L 51/08* (2013.01)

(58) Field of Classification Search
None
See application file for complete search history.

(56) References Cited

U.S. PATENT DOCUMENTS

| | | | | |
|---|---|---|---|---|
| 6,035,336 A * | 3/2000 | Lu | .......... | H04H 20/82 709/229 |
| 7,792,277 B2 * | 9/2010 | Shaffer | ............ | H04M 3/42187 379/266.02 |
| 7,881,450 B1 * | 2/2011 | Gentle | ............... | H04M 3/4286 379/215.01 |
| 8,175,638 B2 * | 5/2012 | Cowherd | ............ | H04L 65/4007 455/556.1 |
| 8,537,981 B1 * | 9/2013 | Cyriac | ..................... | H04L 51/20 379/88.12 |
| 9,204,098 B1 * | 12/2015 | Cunico | ................ | G11B 27/036 |
| 9,525,711 B2 * | 12/2016 | Ackerman | ............ | G06Q 10/10 |
| 10,469,802 B2 * | 11/2019 | Buford | ................... | H04N 7/155 |
| 10,542,126 B2 * | 1/2020 | Nayak | ..................... | H04L 69/28 |
| 2003/0231748 A1 * | 12/2003 | Novelline | ............ | H04M 1/642 379/88.23 |
| 2004/0093263 A1 * | 5/2004 | Doraisamy | .... | G06Q 10/063112 705/7.14 |
| 2005/0043940 A1 * | 2/2005 | Elder | ................ | G06F 16/24522 704/9 |
| 2005/0233736 A1 * | 10/2005 | Berstis | ................ | H04L 12/1831 455/416 |

(Continued)

*Primary Examiner* — Backhean Tiv

(57) ABSTRACT

The technology disclosed herein enables user participation in a communication session using prerecorded messages. In a particular embodiment, a method includes determining a first context of a first prerecorded message from a user. In real-time during a communication session that exchanges user communications between a plurality of participants, the method includes determining a session context of the user communications and determining that the first context corresponds to the session context preceding a first insertion point in the user communications. The method further includes inserting the first prerecorded message into the user communications at the first insertion point.

20 Claims, 8 Drawing Sheets

(56) References Cited

U.S. PATENT DOCUMENTS

| | | | |
|---|---|---|---|
| 2008/0159507 A1* | 7/2008 | Virolainen | H04M 1/72412 379/202.01 |
| 2008/0259155 A1* | 10/2008 | McLelland | H04N 7/147 348/14.03 |
| 2008/0273077 A1* | 11/2008 | Cowherd | H04N 7/147 348/14.06 |
| 2009/0019374 A1* | 1/2009 | Logan | H04M 3/4872 715/753 |
| 2009/0312040 A1* | 12/2009 | Gupta | G06Q 30/02 455/466 |
| 2010/0279658 A1* | 11/2010 | Singh | H04M 1/645 455/412.1 |
| 2010/0303227 A1* | 12/2010 | Gupta | H04M 3/4286 379/266.06 |
| 2010/0318399 A1* | 12/2010 | Li | G06Q 10/1093 705/7.18 |
| 2011/0069822 A1* | 3/2011 | Jan | G06F 40/30 379/88.04 |
| 2011/0107236 A1* | 5/2011 | Sambhar | H04L 12/1827 715/753 |
| 2011/0151838 A1* | 6/2011 | Olincy | H04M 1/64 455/412.1 |
| 2013/0139071 A1* | 5/2013 | Hoff | G06F 16/285 715/756 |
| 2013/0246327 A1* | 9/2013 | Tabrizi | G06Q 30/01 706/50 |
| 2013/0290434 A1* | 10/2013 | Bank | G06Q 10/10 709/206 |
| 2014/0289326 A1* | 9/2014 | McCormack | H04L 65/1093 709/204 |
| 2015/0181301 A1* | 6/2015 | Bloch | H04N 21/4532 725/41 |
| 2015/0381933 A1* | 12/2015 | Cunico | G10L 25/63 348/14.08 |
| 2015/0381939 A1* | 12/2015 | Cunico | G06T 7/20 348/14.07 |
| 2016/0112212 A1* | 4/2016 | Tabrizi | H04L 12/1822 715/756 |
| 2017/0032395 A1* | 2/2017 | Kaufman | G06F 3/0482 |
| 2019/0035403 A1* | 1/2019 | Ramasamy | G06F 16/24 |
| 2019/0102374 A1* | 4/2019 | Tiwari | G06Q 50/01 |

* cited by examiner

COMMUNICATION SESSION PARTICIPATION USING PRERECORDED MESSAGES

TECHNICAL BACKGROUND

When a user is unable to participate on a communication session with other users, the user cannot provide input in real time on the communication session. Rather, at best, the absent user may be able to communicate information to one or more of the other users in a different manner (e.g., sending an email or calling them directly). Receipt of that information by the other users outside of the communication session may not have the same impact as if those other users heard the information from the absent user on the communication session. Thus, the absent user may be at a disadvantage due to the fact that they were unable to attend the communication session.

SUMMARY

The technology disclosed herein enables user participation in a communication session using prerecorded messages. In a particular embodiment, a method includes determining a first context of a first prerecorded message from a user. In real-time during a communication session that exchanges user communications between a plurality of participants, the method includes determining a session context of the user communications and determining that the first context corresponds to the session context preceding a first insertion point in the user communications. The method further includes inserting the first prerecorded message into the user communications at the first insertion point.

In some embodiments, the method includes determining a second context of a second prerecorded message. In real-time during the communication session, the method of those embodiments includes determining that the second context corresponds to the session context preceding a second insertion point in the user communications and inserting the second prerecorded message into the user communications at the second insertion point.

In some embodiments, after inserting the first prerecorded message, the method includes receiving a response message from a first participant of the plurality of participants in response to the first prerecorded message and providing the response message to the user. In those embodiments, providing the response message may include sending the response message as an attachment of an email to the user.

In some embodiments, after inserting the first prerecorded message, the method includes receiving a response message in the user communications from a first participant of the plurality of participants in response to the first prerecorded message, determining that a second context of a second prerecorded message corresponds to a response context of the response message, and inserting the second prerecorded message into the user communications after the response message.

In some embodiments, the method includes identifying a gap in the user communications as the first insertion point.

In some embodiments, determining the first context includes converting speech of the user in the first message to text, tokenizing one or more sentences in the text into tokens, and analyzing the tokens to determine one or more topics of the text. In those embodiments, determining that the first context relates to the session context may include determining that the one or more topics of the text correspond to one or more topics of the user communications.

In some embodiments, the user is not present on the communication session.

In some embodiments, the prerecorded message includes an audio component comprising speech of the user.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to determine a first context of a first prerecorded message from a user. In real-time during a communication session that exchanges user communications between a plurality of participants, the program instructions direct the processing system to determine a session context of the user communications and determine that the first context corresponds to the session context preceding a first insertion point in the user communications. The program instructions also direct the processing system to insert the first prerecorded message into the user communications at the first insertion point.

DETAILED DESCRIPTION

The examples provided herein allow a user to participate in a communication session between two or more other users using prerecorded messages. The prerecorded messages are automatically inserted (e.g., played back) in the user communications at a point where the prerecorded message fits into the context of the user communications. By inserting the prerecorded message into the user communications, the user is able to present information on the communication session rather than having to communicate the information in another manner (e.g., via email). Since the prerecorded message is inserted within context, the users on the communication session will likely already be in the right mindset to consume the information in the prerecorded message. The end result allows the user to present information on the communication session in a manner similar to if that user presented the information live in the user communications.

Figure 1:
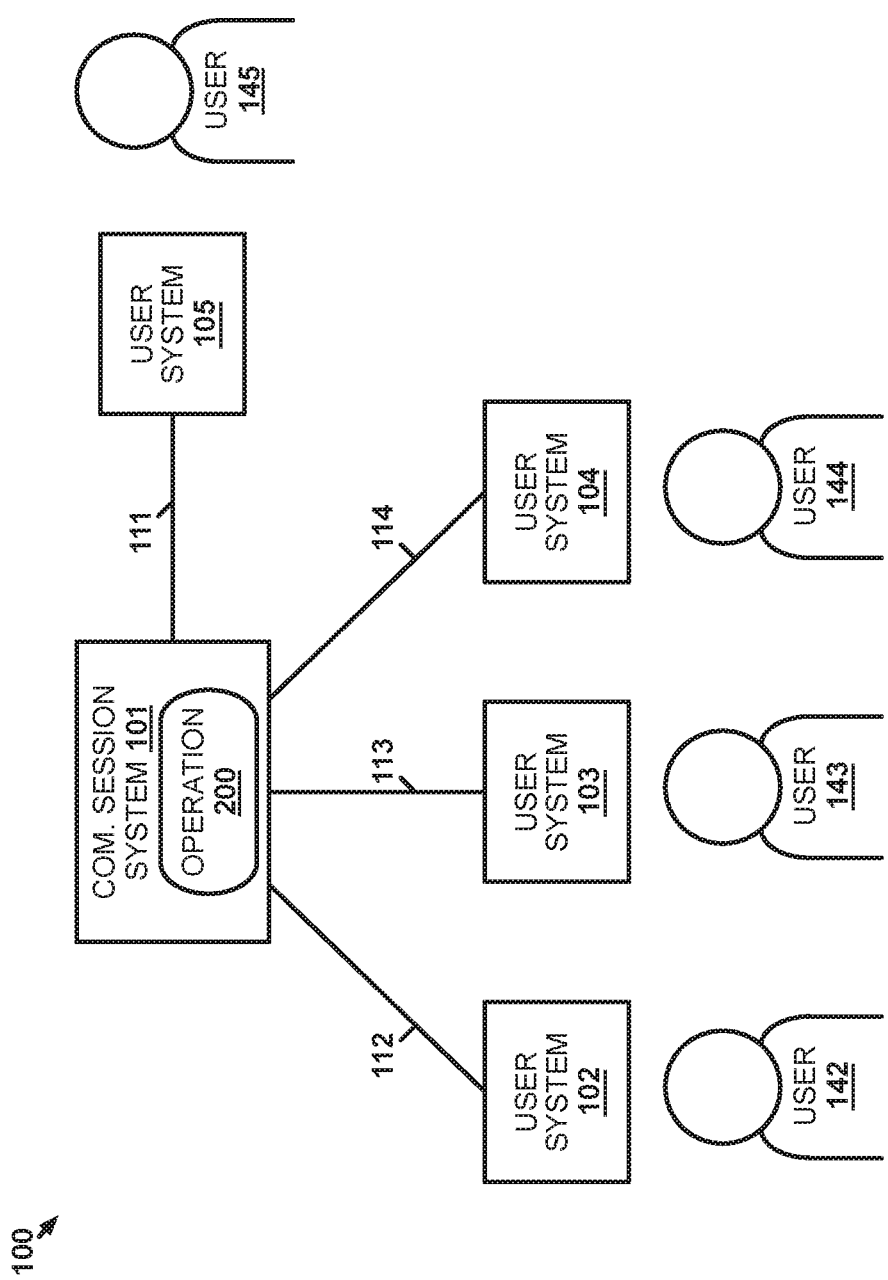
FIG. 1 illustrates an implementation for participating in a communication session using prerecorded messages.

FIG. 1 illustrates implementation 100 for participating in a communication session using prerecorded messages. Implementation 100 includes communication session system 101 and user systems 102-105. Communication session system 101 and user systems 102-105 communicate over respective communication links 111-114. Communication links 111-114 may be wired and/or wireless. Communication links 111-114 are shown as direct links but may include intervening systems, networks, and/or devices.

In operation, user systems 102-105 are operated by their respective users 142-145. A user system of user systems 102-105 may be a telephone, laptop, personal computer, tablet computer, or some other type of user operable computing system. Communication session system 101 is a computing system that facilitates the exchange of user communications (e.g., voice, video, text, etc. captured from users) between users via communication sessions established between user systems, such as a teleconferencing server. For example, two or more of user systems 102-105 connect to communication session system 101 to establish a communication session that allows their respective users 142-145 to communicate with one another in real time (e.g., speak to one another). Communication session system 101 also performs operation 200 to enable users, who may not be able to join a communication session, to participate in the real-time user communications of the communication session using prerecorded messages.

Figure 2:
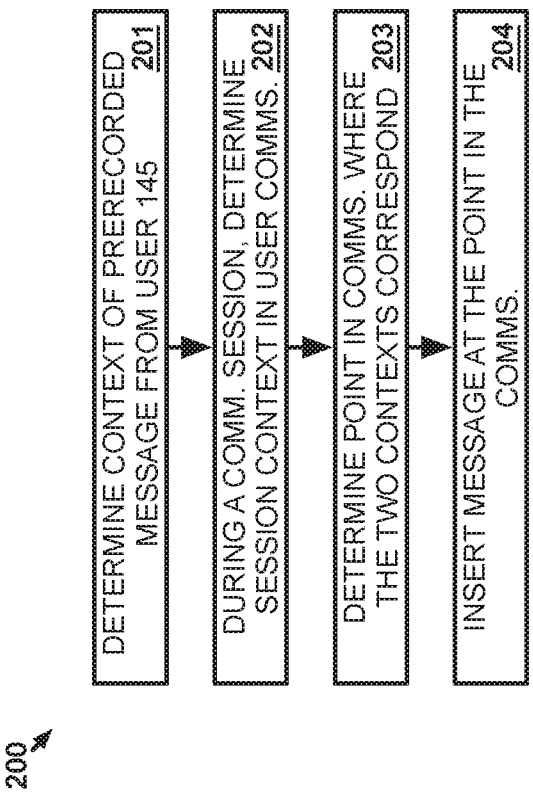
FIG. 2 illustrates an operation to participate in a communication session using prerecorded messages.

FIG. 2 illustrates operation 200 to participate in a communication session using prerecorded messages. Operation 200 is an example of steps that communication session system 101 may perform to insert prerecorded messages from user 145 into user communications on a communication session between users 142-144. While three users are participants on the communication session in this example, any number of two or more users may be participating on the communication session. In operation 200, communication session system 101 determines a context of a prerecorded message from user 145 (201). The prerecorded message may be an audio message, a video message, a text message, or some other type of message that is supported by the communication session. For example, the prerecorded message may be an audio message captured from user 145 (e.g., a message spoken by user 145) when the communication session supports audio (e.g., is an audio only or video communication session). In this example, user system 105 may capture the prerecorded message and transfer the prerecorded message to communication session system 101 at the direction of user 145. The prerecorded message may be received at any time prior to its insertion into the user communications. Communication session system 101 may receive the prerecorded message prior to the establishment of the communication session or during the communication session, as may be the case if, for example, user 145 has to leave the communication session early but still has information to present.

Unless the prerecorded message is already in a text format, communication session system 101 may convert speech in the prerecorded message to text in order to analyze what is being said by user 145 in the prerecorded message. From what is said in the prerecorded message (i.e., from the content of the prerecorded message), communication session system 101 determines the context of the prerecorded message. The context may include a topic discussed in, or otherwise applicable to, the content of the prerecorded message. Communication session system 101 may identify keywords in the prerecorded message that indicate a particular topic. The context may further include an aspect of the topic, which communication session system 101 may use to determine an applicable point during a discussion of the topic where the prerecorded message should be inserted. For example, if the topic is a particular widget and different possible aspects about the topic may include costs for the widget, color of the widget, size of the widget, etc. The context may also consider topics in the user communications before the current context. In some examples, communication session system 101 may analyze documents associated with the communication session (e.g., meeting agenda, presentation slides, etc.) to determine what topics (and potentially aspects) are the subject of the communication session. In those examples, communication session system 101 may determine whether the content of the prerecorded message corresponds to anything in the documents (e.g., whether a document, or portion of a document, contains similar keywords as the prerecorded message.

In some examples, communication session system 101 may employ an artificial intelligence (AI) algorithm, such as a natural language processing algorithm, to determine the context of the prerecorded message. For example, the AI algorithm may be a named-entity recognition algorithm that locates and classifies named entities (e.g., real-world objects that can be given a proper name) in the prerecorded message, which may indicate the topic (or topic aspect) of the prerecorded message. In those examples, a conditional random fields (CRF) model may be used to help the named-entity recognition algorithm identify named entities. The AI algorithm may be a machine learning algorithm that is trained by analyzing other recordings with known contexts to learn how contexts can be identified from other messages (e.g., the prerecorded message of this example).

In real-time during the communications session, communication session system 101 determines a session context of the user communications being exchanged between user systems 102-104 (202). By determining the session context in real time, communication session system 101 is able to identify the session context at the current time as the communication session progresses. As such, the session context may change as the conversation (or presentation, or otherwise) in user communications progresses over time (e.g., changes from one topic to another). Communication session system 101 may determine the session context in the similar manner (e.g., using the same/similar algorithms) as it used to determine the context of the prerecorded message.

As it is determining the session context in real time, communication session system 101 also determines that the context of the prerecorded message corresponds to the session context preceding an insertion point in the user communications (203). The two contexts may correspond if they are the same or are otherwise related to one another in some manner. For example, the context of the prerecorded message may include a topic/aspect that is also included in the session context. Alternatively, the topic/aspect in the context of the prerecorded message may be related to the topic/aspect in the session context. For example, the topic of the prerecorded message may be widget production cost and the topic of the session context may be cost of plastic used in the widget. Since the cost of plastic affects the production cost, the two contexts relate to each other.

To avoid interrupting the flow of the user communications (e.g., to avoid playback of the prerecorded message while a participant is speaking), communication session system 101 preferably does not simply determine the insertion point to be the current time when communication session system 101 determines that the two contexts correspond. Instead, communication session system 101 may continue to analyze the user communications after determining that the two contexts correspond to determine an appropriate insertion point. The insertion point may simply be a first gap in the user communications (i.e., when no one is speaking) of a predefined threshold duration (e.g., 2 seconds) or communication session system 101 may analyze the immediately preceding speech to a gap to determine whether insertion of the message is appropriate or whether one of the users participating in the communication session should speak first. For example, user 142 may ask a question immediately before a gap in the user communications, unless communication session system 101 has determined that the prerecorded message answers the question, communication session system 101 will determine the insertion point to occur in a gap after user 143 or user 144 answers the question.

Communication session system 101 may also use an AI algorithm to determine the insertion point. The AI algorithm may be trained using other user communications from other communication sessions. Based on the other user communications, the AI algorithm may learn conditions where it is appropriate to insert a prerecorded message from a user based on when users in those other user communications speak (or type if chat based) in relation to the other users speaking. Essentially, the AI algorithm learns how to recognize the flow in the user communications being exchanged (e.g., conversation flow or presentation flow) so that an insertion point in the prerecorded message does not adversely affect that flow, or at least mitigates the adverse effects on the flow.

Upon determining the insertion point, communication session system 101 inserts the prerecorded message into the user communications at the insertion point (204). Inserting the prerecorded message into the user communications results in users 142-144 being presented with the prerecorded message beginning at the insertion point. Communication session system 101 may distribute the prerecorded message in the user communications to user systems 102-104 in the same manner communication session system 101 distributes user communications received from one of user systems 102-104 to the others (e.g., distributes speech captured from user 142 via user system 102 to user system 103 and user system 104 for presentation to user 143 and user 144, respectively, in the normal course of the communication session). In some examples, the prerecorded message may be represented on a user interface at each of user systems 102-104 as coming from user 145 as though user 145 was a participant on the communication session. For instance, if the prerecorded message is an audio message, then user systems 102-104 will indicate that user 145 (e.g., highlight user 145 in a list of participants) is speaking while the prerecorded message is being played in the user communications. Similarly, if the prerecorded message is a video message, then user systems 102-104 may increase the size of a video window playing back the prerecorded message to highlight that user 145 is speaking via the prerecorded message. In another example, the prerecorded message may be a text message and communication session system 101 may insert the text of the prerecorded message into a text chat thread with an indication that the prerecorded message is from user 145.

In some examples, communication session system 101 may indicate that the prerecorded message, when inserted, is from a user not participating in the communication session live. For example, the a participant list may show user 145 with a visual indicator that user 145 is not actually on the communication session or may audibly indicate that the prerecorded message being played was previously received from user 145. In some examples, user systems 102-104 may indicate that user 145 will be participating using one or more prerecorded messages (e.g., by including user 145 in the participant list from the onset of the communication session) so that users 142-144 are prepared for the fact that, at some point, a prerecorded message will be played from someone not attending the communication session.

While only one prerecorded message is discussed in the above examples, user 145 may provide multiple prerecorded messages. Since each of those prerecorded messages may have different contexts, communication session system 101 would perform operation 200 with respect to each message. One prerecorded message may, therefore, be inserted at one point based on the real-time session context preceding that point while another prerecorded message may be inserted at another point based on the real-time session context at that other point. In some cases, user 145 may supply a single prerecorded message that communication session system 101 determines to include multiple contexts. Communication session system 101, in those examples, may then automatically separate the prerecorded message into multiple prerecorded messages based on those determined contexts.

In some examples, communication session system 101 may recognize that user communications received from one or more of user systems 102-104 constitute a message(s) in response to the prerecorded message by one or more of users 142-144. In those examples, communication session system 101 may store a response message and provide the response message to user 145. For example, user 145 may operate user system 105 to log into communication session system 101 using a client executing on user system 105 to determine whether any response messages were received to user 145's prerecorded message and access those response messages. In another example, communication session system 101 may send user 145 a message (e.g., email) that includes the response message. Other manners of providing a response message to user 145 may also be used.

The response message discussed above may also be addressed by another prerecorded message received by user 145. In such an example, communication session system 101 determines that the context of the response message corresponds to the context of another prerecorded message received from user 145 and inserted the other prerecorded message into the user communications after the response message. The above example may be carried out by communication session system 101 continuing to perform the steps of operation 200. The session context in this case would indicate that a question has been asked about a particular topic that corresponds to the context determined for another prerecorded message. Communication session system 101 would then insert the other prerecorded message in the user communications after the response message. In some cases, the other prerecorded message may have been recorded by user 145 specifically as a possible response to a question, which user 145 may indicate through user system 105. In those cases, the other prerecorded message may only be inserted into the user communications should an appropriate question be asked by users 142-144.

In the above examples, user 145 is absent from the communication session. Although, user 145 may be present on the communication session via user system 105 in other examples. For example, user 145 may only be on the communication session to address a particular item/topic on the agenda for the communication session. Rather than having to pay attention to the user communications to determine when user 145 needs to actively participate, user 145 may provide a prerecorded message. Communication session system 101 may insert that prerecorded message using operation 200 and then user 145 can followup with live contributions thereafter. Communication session system 101 may present user 145 with a notification via user system 105 (e.g., a visual notification banner, audio tone, etc.) to draw user 145's attention to the fact that the prerecorded message is being played and user 145 may want to actively participate.

Advantageously, by performing operation 200, communication session system 101 enables the participation of user 145 in the user communications of a communication session even though user 145 may not be a live participant on the communication session. It should be understood that, while operation 200 is performed by communication session system 101 in the above example, the steps may be performed by another system with access to send and receive user communications on a communication session. A more detailed example of such a system is discussed with respect to FIGS. 6 and 7 below.

Figure 3:
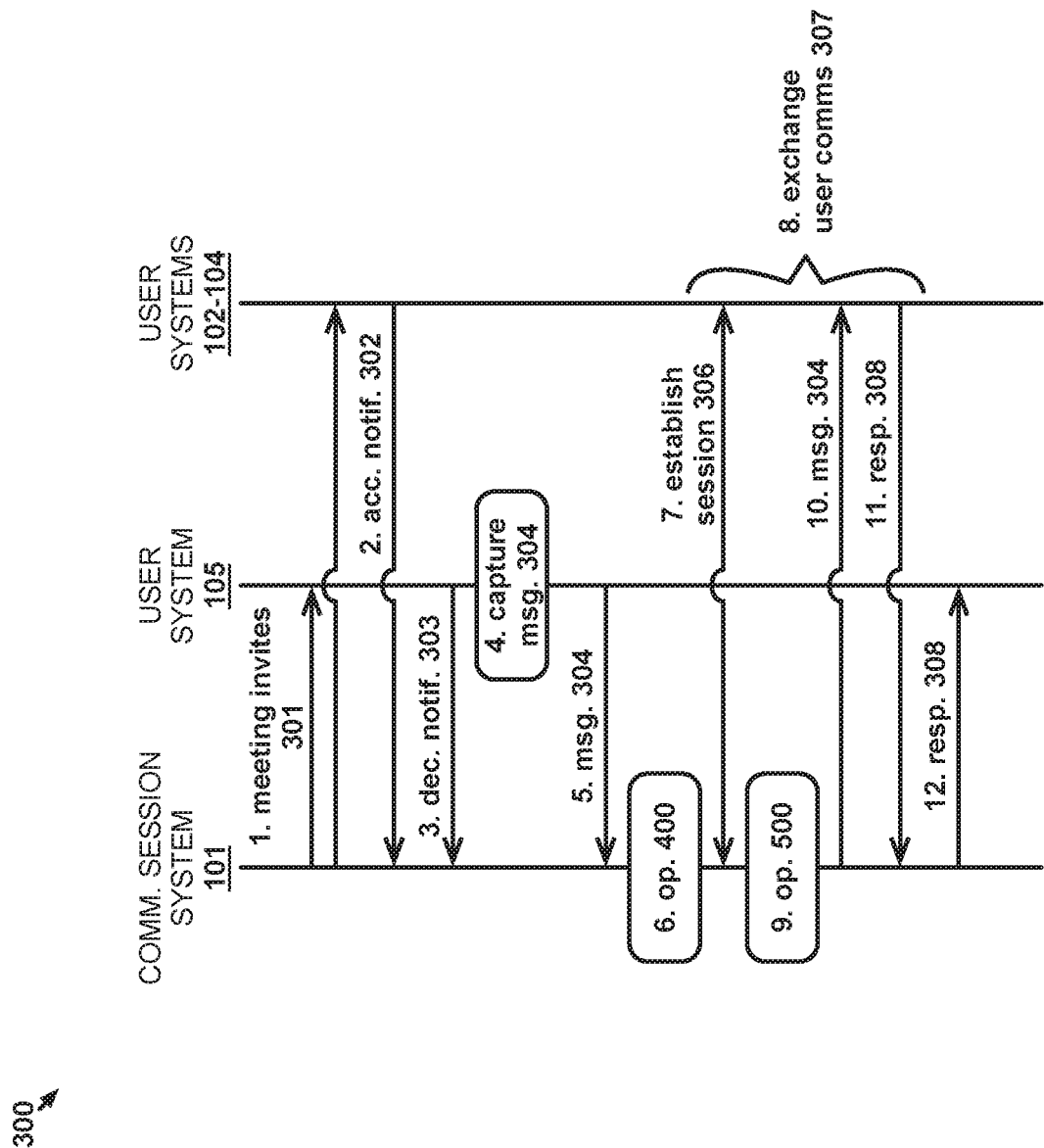
FIG. 3 illustrates an operational scenario for participating in a communication session using prerecorded messages.

FIG. 3 illustrates operational scenario 300 for participating in a communication session using prerecorded messages. Operational scenario 300 is another example of how the systems in implementation 100 may operate to enable participation using prerecorded messages. In operational scenario 300, communication session system 101 sends meeting invites 301 at step 1 to user systems 102-105, which invite users 142-145 to join communication session 306 at a later time specified in meeting invites 301. While communication session system 101 sends meeting invites 301 in this example, a different system, such as an electronic calendar system, may send meeting invites 301 in other examples. Communication session 306 may be a voice conference, a video conference, or some other type of communication session that enables real-time user communications between participants—including combinations thereof.

In this example, communication session system 101 receives acceptance notifications 302 at step 2 from user systems 102-104. Acceptance notifications 302 indicate that users 142-144 of respective user systems 102-104 intend to participate in communication session 306. Communication session system 101 also receives decline notification 303 at step 3 from user system 105. Decline notification 303 indicates that user 145 does not intend to participant in communication session 306. While steps 2 and 3 are shown sequentially in operational scenario 300, it should be understood that individual ones of acceptance notifications 302 and decline notification 303 may be received in any order. Likewise, a user may change their mind and change send messages changing their acceptance status. In some examples, communication session system 101 may not receive messages about whether a user accepts or declines an invitation from one or more of user systems 102-105.

Since user 145 declined to join communication session 306, user system 105 captures message 304 at step 4 from user system 105. In this example, message 304 includes at least an audio component that includes speech from user 145. Message 304 may be a voice message, a video message, including a video and audio component. User system 105 may execute a client software application with which user 145 interacts to direct user system 105 to capture message 304. The client may ask user 145 whether user 145 would like to record a message in response to user 145 indicating that they will not join communication session 306 or user 145 may direct the client to record message 304 at some other time. User system 105 transfers message 304 at step 5 to communication session system 101 which stores message 304 to be a prerecorded message for insertion during communication session 306. While message 304 is transferred separately in this example, message 304 may be sent along with, or as a part of, decline notification 303 in other examples. After receiving message 304, communication session system 101 performs operational scenario 400 at step 6.

Figure 4:
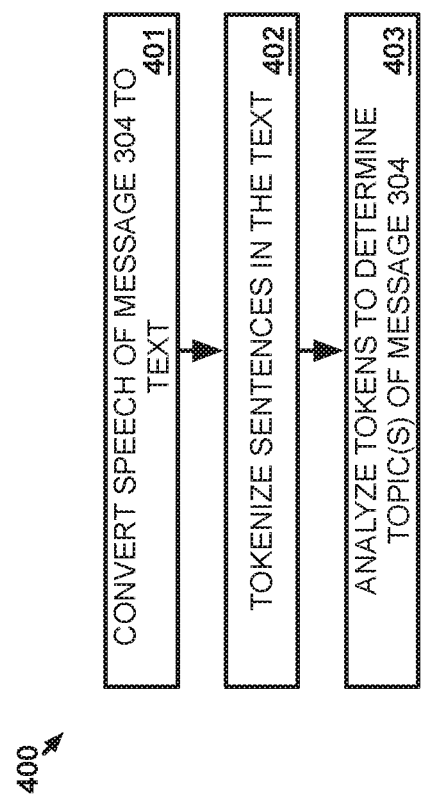
FIG. 4 illustrates another operational scenario for participating in a communication session using prerecorded messages.

FIG. 4 illustrates operational scenario 400 for participating in a communication session using prerecorded messages. Operational scenario 400 is an example of how AI may be used to process message 304 to determine at least a portion of the context of message 304. In operational scenario 400, communication session system 101 converts speech in the audio of message 304 to text (401). A speech recognition algorithm may be used by communication session system 101, such as an algorithm using Hidden Markov Models or an artificial neural network to recognize words being said in speech.

Communication session system 101 then tokenizes sentences in the text of message 304 (402). Tokenizing a sentence breaks the sentence down into smaller parts and is an integral step in many forms of natural language processing. For instance, the tokens generated by the tokenization may each be a character, an individual word, or a subword (e.g., prefix, root, or suffix) from the sentence, which may depend on natural language processing algorithm used to perform the tokenization. Communication session system 101 analyzes the tokens to determine one or more topics in message 304 (403). A natural language processing algorithm may use one or more topic modeling libraries to analyze the tokens and extract the one or more topics of the sentence therefrom. In this example, communication session system 101 determines that the context of message 304 includes topic Z, as discussed further below. While operational scenario 400 only discusses the determination of topic(s) when determining the context of message 304, it should be understood that other aspects of message 304 may also be determined and considered for inclusion the context of message 304.

In this example, message 304 in its entirety will be inserted into user communications 307 of communication session 306. Thus, the topic(s) determined in operational scenario 400 are included in the context of message 304 for determining where in user communications 307 message 304 should be inserted. Although, in some examples, message 304 may include multiple distinct messages therein having different topics (e.g., rather than user 145 providing separate recordings for each topic, user 145 includes everything in a single recording of message 304). In those examples, operational scenario 400 may further use the determined topics of message 304 to separate message 304 into multiple messages for insertion at different points in user communications 307.

Referring back to operational scenario 300, at a time after receiving message 304, communication session system 101 establishes communication session 306 at step 7 between user systems 102-104. Communication session system 101 may initiate communication session 306 to user systems 102-104 or may wait for ones of user systems 102-104 to initiate connections to communication session system 101 to join communication session 306. User systems 102-104 need not join communication session 306 at the same time. For instance, users 142-144 may each direct their respective one of user systems 102-104 to join communication session 306 (e.g., select a link in meeting invites 301, dial a phone number, select a "join" button in a session client, etc.) at a different time. After establishment of communication session 306 between two or more of user systems 102-104, user communications 307 are exchanged at step 8 between user systems 102-104. User communications 307 are at least voice captured from users 142-144 and may also include video captured of users 142-144 if communication session 306 is a video communication session. The exchange of user communications 307 allows users 142-144 to converse with one another even though they, and their respective user systems 102-104, are not colocated. During the exchange of user communications 307, operational scenario 500 occurs at communication session system 101 at step 9.

Figure 5:
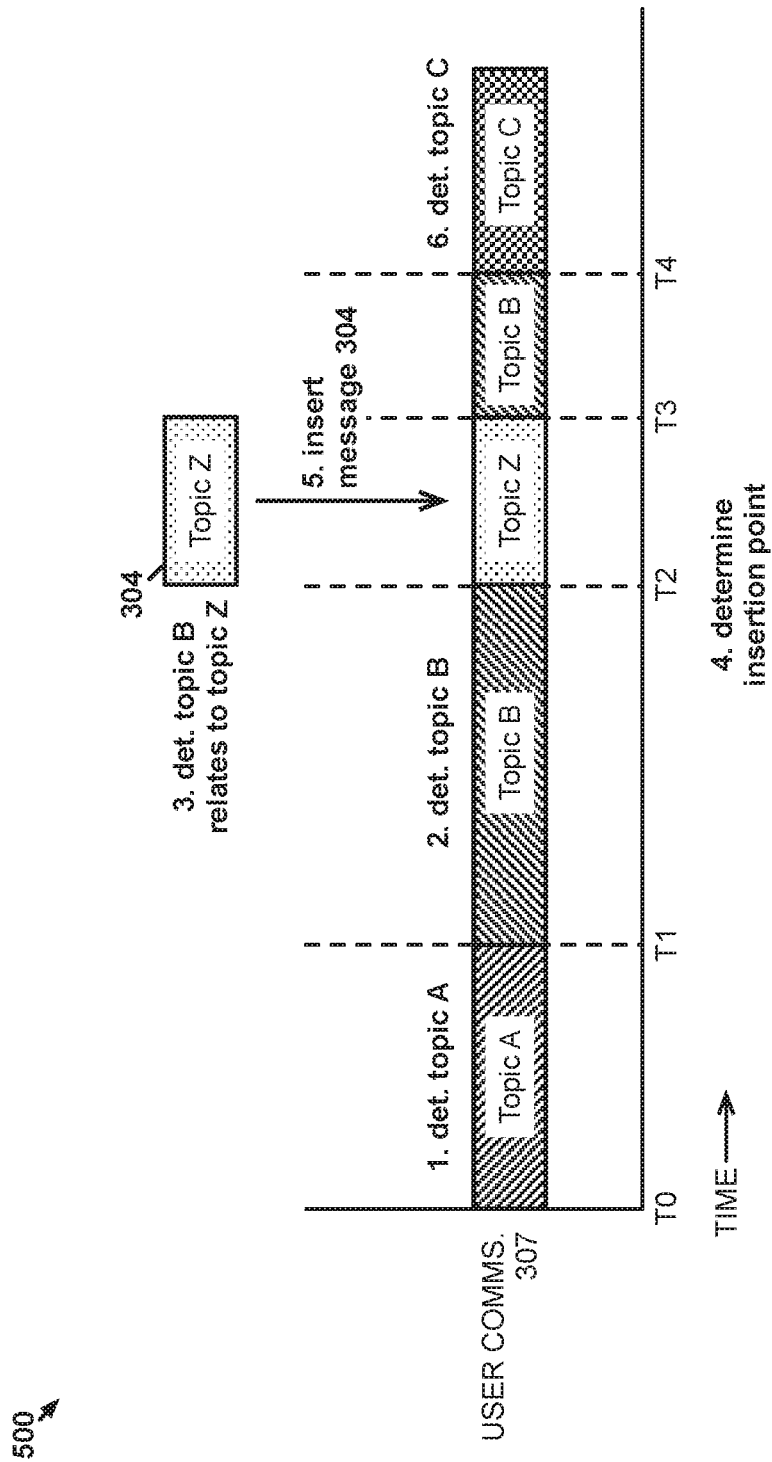
FIG. 5 illustrates another operational scenario for participating in a communication session using prerecorded messages.

FIG. 5 illustrates operational scenario 500 for participating in a communication session using prerecorded messages. Operational scenario 500 shows a timeline as user communications 307 progress in real time from time T0, which represents the start of user communications 307 being exchanged on communication session 306. In operational scenario 500, communication session system 101 analyzes user communications 307 to identify a point in user communications 307 to insert message 304. In this example, communication session system 101 determines a topic currently being discussed in real time during the exchange of user communications 307. Communication session system 101 may determine the current topic in a manner similar to how topic Z of message 304 was determined in operational scenario 400. Alternatively, a different algorithm may be used, such as an algorithm more suited to real-time analysis of communications. The current topic is at least a portion of the context of communication session 306 that communication session system 101 considers when determining when message 304 should be inserted into user communications 307.

In operational scenario 500, communication session system 101 determines that user communications 307 are about topic A (e.g., include a discussion or presentation about topic A) at step 1. Since topic A is at the beginning of the exchange of user communications 307, topic A may simply be an exchange of pleasantries between users 142-144. Although, it is possible that topic A is a different topic if users 142-144 skip the exchange of pleasantries. At a time T1, user communications 307 switch from topic A to topic B and communication session system 101 determines that user communications 307 are about topic B at step 2 accordingly.

After determining that the context of communication session 306 from T1 includes topic B, communication session system 101 determines that topic B relates to topic Z from message 304 at step 3. Topic B may relate to topic Z by virtue of being equivalent to topic Z or otherwise complementary to topic Z. To be complimentary, topic Z may be a subtopic or aspect of topic B or may be pertinent to topic B in some other manner. Though not shown, communication session system 101 between T0 and T1 may similarly have compared topic Z to topic A and determined that topic A does not relate to topic Z.

If communication session system 101 was to insert message 304 immediately upon determining that topic B relates to topic Z, then communication session system 101 may inadvertently disrupt the flow of user communications 307. For example, inserting message 304 may interrupt or play over one of users 142-144 that is currently speaking or may be played at a time when another user's input would make more sense (e.g., to answer a question that was asked). Accordingly, communication session system 101 continues to determine further aspects of the context of user communications 307 to determine an appropriate point in communication session system 101 into which communication session system 101 should be inserted. The further context aspects at least include a gap in user communications 307 where none of users 142-144 are speaking. For example, communication session system 101 may use a predetermined threshold amount of time that must elapse since one of users 142-144 last spoke before communication session system 101 will insert message 304. In some examples, communication session system 101 may use an algorithm trained using machine learning to capture contextual nuances (e.g., voice tones, phrases, etc.) that are indicative of when a message should be inserted. The algorithm may have been trained using other user communications that include proper transitions between users speaking. Thus, based on the other user communications, the algorithm learns to recognize when a user should begin speaking in relation to other users. In operational scenario 500, when the algorithm recognizes a point when user 145 should "begin speaking" via insertion of message 304.

In this example, communication session system 101 determines at step 4 that message 304 should be inserted at time T2 during the real time exchange of user communications 307. Communication session system 101 then inserts message 304 at T2 accordingly at step 5. To insert the message, communication session system 101 streams message 304 to each of user systems 102-104 in the same way communication session system 101 streams user communications received from one of user systems 102-104 to the others in real time. As such, user systems 102-104 will playback message 304 to their respective users 142-144 (e.g., will play audio/video of message 304). During streaming of message 304, communication session system 101 may prevent user communications from any of user systems 102-104 from playing over message 304 (e.g., may mute user communications of users 142-144) to ensure message 304 is not interrupted. The insertion of message 304 ends at time T3 (i.e., the duration of message 304 is the time elapsed between T2 and T3).

After insertion of message 304, user communications 307 continue between users 142-144 from T3. In this case, user communications 307 continue to be about topic B (e.g., users 142-144 may discuss what was said by user 145 in message 304) until time T4. At T4, user communications 307 switch to topic C. Communication session system 101 only received message 304 for insertion in user communications 307 in this example. In other examples, communication session system 101 may store additional prerecorded messages from user 145, or otherwise, from which communication session system 101 still needs to determine an insertion point. In at least those examples, communication session system 101 continues determining the current topic of user communications 307 at step 6, which is topic C after T4. Although, communication session system 101 in this example may continue to determine the current topic even though no message remains to be inserted. User communications 307 may continue beyond what is shown in operational scenario 500 and communication session system 101 may continue to determine the current topic accordingly.

Referring back to operational scenario 300, step 10 illustrates where communication session system 101 inserts message 304 into user communications 307, as discussed in operational scenario 500. In this example, response 308 is received from one of users 142-144 at step 11 via their respective one of user systems 102-104 after user systems 102-104 present message 304 in user communications 307. Response 308 is recognized from within user communications 307 by communication session system 101. Communication session system 101 may recognize key words or phrases in words of response 308, which indicate that those words are responsive to response 308. In some examples, the user speaking response 308 may need to explicitly state that they are responding to message 304 (e.g., may say "this is in response to user 145 remarks"). Alternatively, communication session system 101 may use algorithm trained using machine learning to recognize when user communications are responsive to previous user communications. With respect to operational scenario 500, response 308 may be included in user communications 307 between T3 and T4 after insertion of message 304.

Regardless of how response 308 is recognized by communication session system 101, response 308 is stored by communication session system 101 in addition to being transferred to user systems 102-104 within user communications 307. Storing response 308 enables communication session system 101 to transfer response 308 at step 12 to user system 105 for access by user 145. User 145 may need to request response 308 or communication session system 101 may transfer response 308 to user system 105 automatically. In an example of the former, user 145 may interact with a client application on user system 105 for accessing features of communication session system 101. The client may inform user 145 about available responses and provide an interface through which user 145 can playback response 308. In other examples, a similar client may be employed if communication session system 101 automatically transfers response 308 to user system 105. Although, communication session system 101 may use other manners of data transfer as well, such as email (e.g., by attaching response 308 thereto), instant messaging, or some other type of protocol.

Figure 6:
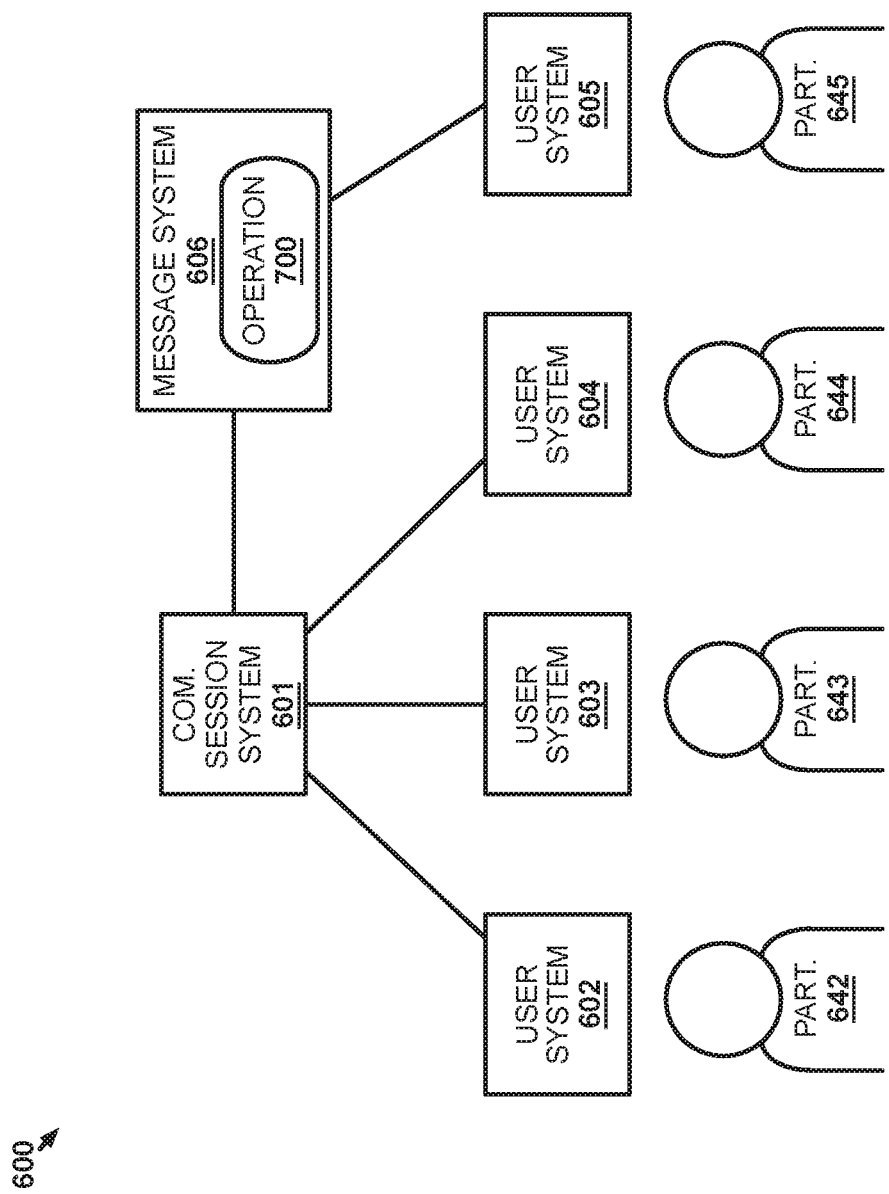
FIG. 6 illustrates an implementation for participating in a communication session using prerecorded messages.

FIG. 6 illustrates implementation 600 for participating in a communication session using prerecorded messages. Implementation 600 includes communication session system 601 and user systems 602-605, which are similar to corresponding communication session system 101 and user systems 102-105 in implementation 100. Implementation 600 also includes message system 606. Though shown separately from user system 605, message system 606 may be incorporated into user system 605. The systems of implementation 600 are connected by communication links similar to communication links 111-114.

In operation, communication session system 601 facilitates the exchange of user communications between user systems. Instead of communication session system 601 performing operation 200 to enable users, who may not be able to join a communication session, to participate in the real-time user communications of the communication session using prerecorded messages, message system 606 performs operation 700, which is a version of operation 200.

Figure 7:
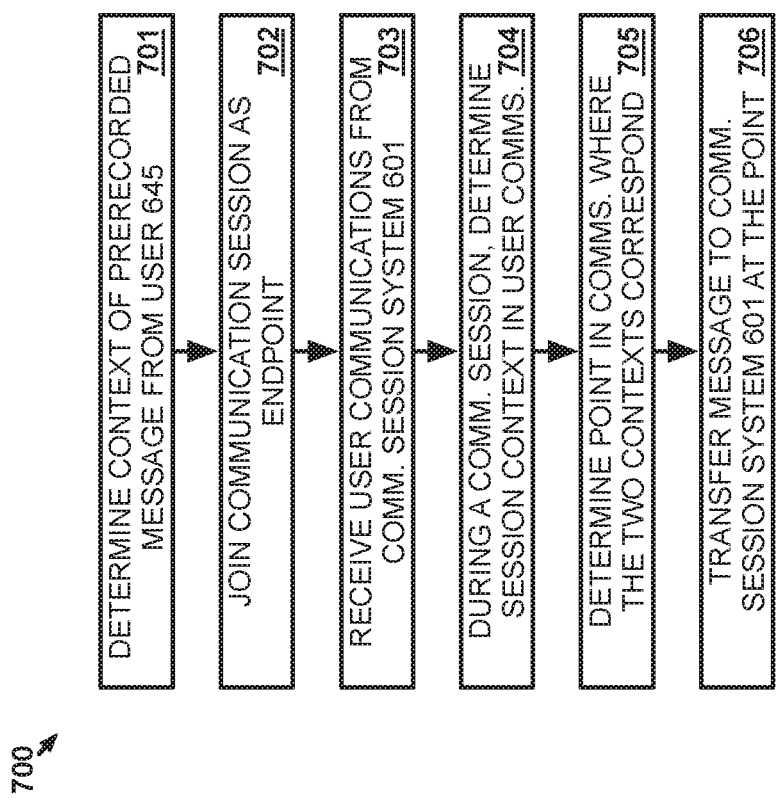
FIG. 7 illustrates an operation to participate in a communication session using prerecorded messages.

FIG. 7 illustrates operation 700 to participate in a communication session using prerecorded messages. Operation 700 is an example of steps that message system 606 may perform to insert prerecorded messages from user 645 into user communications on a communication session between users 642-644 via user systems 602-604. In operation 700, message system 606 determines a context of a prerecorded message received from user 645 (701). The context is determined in a manner similar to that described with respect to step 201 in operation 200. The prerecorded message is received from user system 605 and user 645 may instruct message system 606 to insert the prerecorded message into the user communications of the communication session between users 642-644.

At a time after receiving the prerecorded message, message system 606 joins the communication session facilitated by communication session system 601 (702). Message system 606 may join the communication session in the same manner as user systems 602-604, which causes communication session system 601 to treat message system 606 as another endpoint. Effectively, once message system 606 has joined, the communication session is between user systems 602-604 and message system 606. In some examples, user 645 may provide message system 606 with a link, credentials, or any other information that message system 606 may need to join the communication session on user 645's behalf. As such, to users 642-644, message system 606 being on the communication session may appear to be user 645 joining the communication session (e.g., a participant list displayed by a communication session client may include user 645). In other examples, message system 606 may present itself on the communication session in a manner that indicates to users 642-644 that message system 606 will be providing a prerecorded messages.

Since message system 606 has joined the communication session, message system 606 receives user communications for the communication session from communication session system 601 (703). The user communications at this point are between users 642-644 since message system 606 is not yet participating. In some examples, message system 606 may announce itself in the user communications (e.g., using a synthesized voice) so that users 642-644 know that message system 606 is on the communication session. In real-time during the exchange of the user communications, message system 606 determines a session context of the received user communications (704). The session context is determined in a similar manner to that used by communication session system 101 in step 202 of operation 200. As it is determining the session context in real time, message system 606 also determines that the context of the prerecorded message corresponds to the session context preceding an insertion point in the user communications (705). The correspondence of the prerecorded message context to the session context is determined in a similar manner to that used by communication session system 101 in step 203 of operation 200.

After the insertion point is identified, message system 606 transfers the prerecorded message to communication session system 601 in the user communications at the insertion point, which inserts the prerecorded message into the user communications (706). The prerecorded message is transferred in the same manner user systems 602-604 would transfer voice/video user communications captured from users 642-644 in real time on the communication session. As such, communication session system 601 handles the user communications (i.e., the prerecorded message) from communication session system 601 in the same manner it handles user communications received from user systems 602-604 (i.e., by distributing the user communications to other user systems 602-604 on the communication session).

Advantageously, operation 700 shows how operation 200 can be performed by a system outside of communication session system 601. While operation 700 still includes communication session system 601 facilitating the communication session, other examples may use message system 606 as a peer on a peer-to-peer communication session. Like communication session system 101 in the examples above, message system 606 may also insert additional prerecorded messages and/or handle responses to one or more of the prerecorded messages in the user communications.

Figure 8:
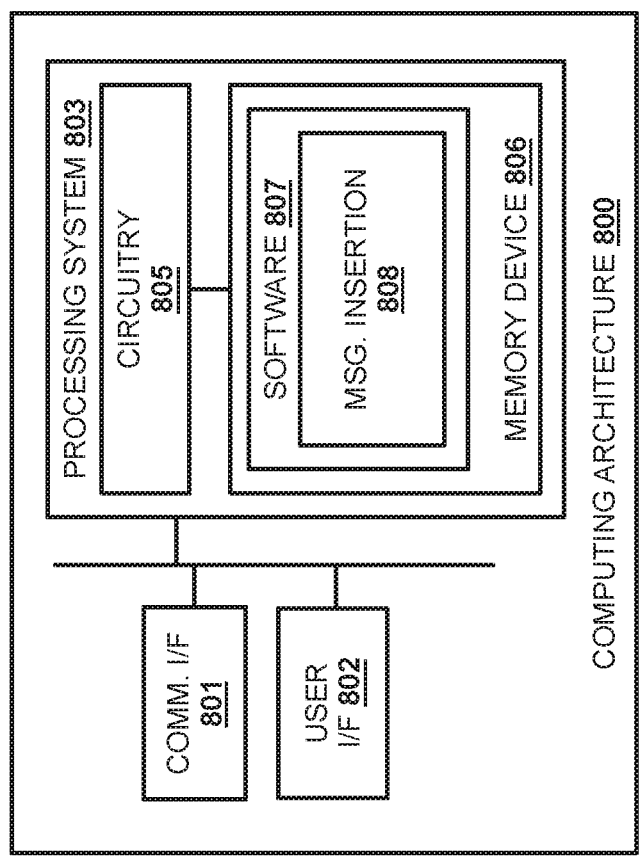
FIG. 8 illustrates a computing architecture for participating in a communication session using prerecorded messages.

FIG. 8 illustrates computing architecture 800 for participating in a communication session using prerecorded messages. Computing architecture 800 is an example computing architecture for communication session system 101 and message system 606, although systems 101 and 606 may use alternative configurations. A similar architecture may also be used for other systems described herein (e.g., user systems 102-105, 602-605), although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes message insertion module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, message insertion module 808 directs processing system 803 to determine a first context of a first prerecorded message from a user. In real-time during a communication session that exchanges user communications between a plurality of participants, message insertion module 808 directs processing system 803 to determine a session context of the user communications and determine that the first context corresponds to the session context preceding a first insertion point in the user communications. Message insertion module 808 also directs processing system 803 to insert the first prerecorded message into the user communications at the first insertion point.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for participating in a communication session using prerecorded messages, the method comprising:
   determining a first context of a first prerecorded message from a user, wherein the first prerecorded message comprises words from the user;
   in real-time during a communication session that exchanges user communications between a plurality of participants:
      determining a session context of the user communications;
      determining that the first context corresponds to the session context preceding a first insertion point in the user communications;
      after determining that the first context corresponds to the session context, identifying the first insertion point, wherein the first insertion point comprises a time that avoids interrupting the plurality of participants; and
      inserting the first prerecorded message into the user communications at the first insertion point.

2. The method of claim 1, further comprising:
   determining a second context of a second prerecorded message;
   in real-time during the communication session:
      determining that the second context corresponds to the session context preceding a second insertion point in the user communications; and
      inserting the second prerecorded message into the user communications at the second insertion point.

3. The method of claim 1, further comprising:
   after inserting the first prerecorded message, receiving a response message from a first participant of the plurality of participants in response to the first prerecorded message; and
   providing the response message to the user.

4. The method of claim 3, wherein providing the response message comprises sending the response message as an attachment of an email to the user.

5. The method of claim 1, further comprising:
   after inserting the first prerecorded message, receiving a response message in the user communications from a first participant of the plurality of participants in response to the first prerecorded message;
   determining that a second context of a second prerecorded message corresponds to a response context of the response message; and
   inserting the second prerecorded message into the user communications after the response message.

6. The method of claim 1, wherein identifying the first insertion point comprises:
   identifying a gap in the user communications as the first insertion point.

7. The method of claim 1, wherein determining the first context comprises:
   converting speech of the user in the first prerecorded message to text;
   tokenizing one or more sentences in the text into tokens; and
   analyzing the tokens to determine one or more topics of the text.

8. The method of claim 7, wherein determining that the first context relates to the session context comprises:
   determining that the one or more topics of the text correspond to one or more topics of the user communications.

9. The method of claim 1, wherein the user is not present on the communication session.

10. The method of claim 1, wherein the first prerecorded message includes an audio component comprising speech of the user.

11. An apparatus for participating in a communication session using prerecorded messages, the apparatus comprising:
- one or more computer readable storage media;
- a processing system operatively coupled with the one or more computer readable storage media; and
- program instructions stored on the one or more computer readable storage media that, when read and executed by the processing system, direct the processing system to:
  - determine a first context of a first prerecorded message from a user, wherein the first prerecorded message comprises words from the user;
  - in real-time during a communication session that exchanges user communications between a plurality of participants:
    - determine a session context of the user communications;
    - determine that the first context corresponds to the session context preceding a first insertion point in the user communications;
    - after determining that the first context corresponds to the session context, identify the first insertion point, wherein the first insertion point comprises a time that avoids interrupting the plurality of participants; and
    - insert the first prerecorded message into the user communications at the first insertion point.

12. The apparatus of claim 11, wherein the program instructions direct the processing system to:
- determine a second context of a second prerecorded message;
- in real-time during the communication session:
  - determine that the second context corresponds to the session context preceding a second insertion point in the user communications; and
  - insert the second prerecorded message into the user communications at the second insertion point.

13. The apparatus of claim 11, wherein the program instructions direct the processing system to:
- after inserting the first prerecorded message, receive a response message from a first participant of the plurality of participants in response to the first prerecorded message; and
- provide the response message to the user.

14. The apparatus of claim 13, wherein to provide the response message, the program instructions direct the processing system to:
- send the response message as an attachment of an email to the user.

15. The apparatus of claim 11, wherein the program instructions direct the processing system to:
- after inserting the first prerecorded message, receive a response message in the user communications from a first participant of the plurality of participants in response to the first prerecorded message;
- determine that a second context of a second prerecorded message corresponds to a response context of the response message; and
- insert the second prerecorded message into the user communications after the response message.

16. The apparatus of claim 11, wherein to identify the first insertion point, the program instructions direct the processing system to:
- identify a gap in the user communications as the first insertion point.

17. The apparatus of claim 11, wherein to determine the first context, the program instructions direct the processing system to:
- convert speech of the user in the first prerecorded message to text;
- tokenize one or more sentences in the text into tokens; and
- analyze the tokens to determine one or more topics of the text.

18. The apparatus of claim 17, wherein to determine that the first context relates to the session context, the program instructions direct the processing system to:
- determine that the one or more topics of the text correspond to one or more topics of the user communications.

19. The apparatus of claim 11, wherein the user is not present on the communication session.

20. One or more computer readable storage media having program instructions stored thereon for participating in a communication session using prerecorded messages, the program instructions, when read and executed by a processing system, direct the processing system to:
- determine a first context of a first prerecorded message from a user, wherein the first prerecorded message comprises words from the user;
- in real-time during a communication session that exchanges user communications between a plurality of participants:
  - determine a session context of the user communications;
  - determine that the first context corresponds to the session context preceding a first insertion point in the user communications;
  - after determining that the first context corresponds to the session context, identify the first insertion point, wherein the first insertion point comprises a time that avoids interrupting the plurality of participants; and
  - insert the first prerecorded message into the user communications at the first insertion point.

* * * * *